US007915803B2

(12) United States Patent
Hamada et al.

(10) Patent No.: US 7,915,803 B2
(45) Date of Patent: Mar. 29, 2011

(54) LAMINATED THICK FILM DIELECTRIC STRUCTURE FOR THICK FILM DIELECTRIC ELECTROLUMINESCENT DISPLAYS

(75) Inventors: Hiroki Hamada, Hirakata (JP); Isao Yoshida, Tsukuba (JP); Vincent Joseph Alfred Pugliese, Oakville (CA); Manuela Peter, Toronto (CA); James Alexander Robert Stiles, Toronto (CA)

(73) Assignees: iFire IP Corporation, Oakville, Ontario (CA); Sanyo Electric Co., Ltd., Moriguchi-Shi, Osaka (JP)

( * ) Notice: Subject to any disclaimer, the term of this patent is extended or adjusted under 35 U.S.C. 154(b) by 226 days.

(21) Appl. No.: 12/109,564

(22) Filed: Apr. 25, 2008

(65) Prior Publication Data

US 2008/0315762 A1 Dec. 25, 2008

Related U.S. Application Data

(60) Provisional application No. 60/924,082, filed on Apr. 30, 2007.

(51) Int. Cl.

*H01J 1/62* (2006.01)
*H01J 63/04* (2006.01)
*B32B 15/00* (2006.01)

(52) U.S. Cl. ........ 313/502; 313/512; 313/507; 428/336; 428/452

(58) Field of Classification Search ........................ None
See application file for complete search history.

(56) References Cited

U.S. PATENT DOCUMENTS

| | | | | |
|---|---|---|---|---|
| 4,209,705 | A | 6/1980 | Washida et al. | |
| 4,751,427 | A | 6/1988 | Barrow et al. | |
| 5,229,628 | A | 7/1993 | Kobayashi et al. | |
| 5,432,015 | A | 7/1995 | Wu et al. | |
| 5,858,561 | A | 1/1999 | Epstein et al. | |
| 6,113,977 | A | 9/2000 | Soininen et al. | |
| 6,358,632 | B1 | 3/2002 | Dickey et al. | |
| 6,589,674 | B2 | 7/2003 | Li et al. | |
| 6,703,335 | B2 * | 3/2004 | Takahashi | 501/134 |
| 6,939,189 | B2 | 9/2005 | Wu | |
| 7,427,367 | B2 | 9/2008 | Stiles | |
| 7,427,422 | B2 | 9/2008 | Wu | |
| 2003/0160247 | A1 | 8/2003 | Miyazawa | |
| 2004/0033307 | A1 * | 2/2004 | Wu et al. | 427/66 |
| 2004/0115859 | A1 | 6/2004 | Murayama et al. | |
| 2004/0135495 | A1 | 7/2004 | Wu et al. | |
| 2004/0170864 | A1 * | 9/2004 | Liu | 428/690 |

(Continued)

FOREIGN PATENT DOCUMENTS

JP 2003-332081 11/2003

(Continued)

OTHER PUBLICATIONS

International Search Report, Int'l Appl. No. PCT/CA2008/000774, Mailed Aug. 5, 2008, ISA/CA.

(Continued)

*Primary Examiner* — Nimeshkumar D Patel
*Assistant Examiner* — Tracie Green
(74) *Attorney, Agent, or Firm* — Fay Sharpe LLP

(57) ABSTRACT

A novel and improved composite thick film dielectric structure is provided to improve the operating stability of phosphors used in thick dielectric ac electroluminescent displays. The novel structure comprises one or more aluminum oxide layers disposed between the composite thick dielectric layer and the bottom of the phosphor layer of these displays.

28 Claims, 3 Drawing Sheets

U.S. PATENT DOCUMENTS

| | | | | |
|---|---|---|---|---|
| 2004/0170865 | A1 * | 9/2004 | Hamada et al. | 428/690 |
| 2005/0202162 | A1 | 9/2005 | Xu et al. | |
| 2006/0017381 | A1 | 1/2006 | Xin et al. | |
| 2006/0250082 | A1 | 11/2006 | Yoshida et al. | |
| 2007/0103069 | A1 | 5/2007 | Manuela et al. | |

FOREIGN PATENT DOCUMENTS

| | | |
|---|---|---|
| WO | WO 00/70917 | 11/2000 |
| WO | WO 03/056879 | 7/2003 |
| WO | WO 2004/057919 A1 | 7/2004 |

OTHER PUBLICATIONS

Jones, *Fundamental Principles of Sol Gel Technology*, The Institute of Metals, 1989.

Stiles, et al., "Polymorphic Barium Thioaluminate Electroluminescent Phosphor Materials", *Journal of Applied Physics*, 100, 074508 (2006), pp. 1-5.

* cited by examiner

LAMINATED THICK FILM DIELECTRIC STRUCTURE FOR THICK FILM DIELECTRIC ELECTROLUMINESCENT DISPLAYS

This application claims the benefit of Provisional Patent Application No. 60/924,082, filed Apr. 30, 2007, the disclosure of which is incorporated herein in its entirety, by reference.

FIELD OF THE INVENTION

The present invention relates to improving the operating stability of blue light-emitting phosphor materials used for full color ac electroluminescent displays. More specifically, the invention is the use of aluminum oxide layer(s) in conjunction with a composite thick film dielectric layer in electroluminescent displays with a high dielectric constant.

BACKGROUND OF THE INVENTION

Throughout this application, various references are cited in parentheses to describe more fully the state of the art to which this invention pertains. The disclosure of these references are hereby incorporated by reference into the present disclosure.

Thick film dielectric structures as exemplified by U.S. Pat. No. 5,432,015 provide for superior resistance to dielectric breakdown as well as a reduced operating voltage as compared to thin film electroluminescent (TFEL) displays. The thick film dielectric structure also enhances the amount of charge that can be injected in to the phosphor film to provide greater luminosity than TFEL displays.

Full colour thick film dielectric electroluminescent displays as is described in the Applicant's U.S. Patent Publication No. 2004/0135495 employ a high luminance blue phosphor material to directly illuminate blue sub-pixels and colour conversion materials to down-convert the blue light to red or green light for the red and green sub-pixels. The blue phosphor material is typically europium activated barium thioaluminate. In the Applicant's U.S. Patent Publication No. 2006/0017381 a thin vacuum deposited aluminum oxide layer is provided positioned directly under and in contact with the phosphor layer to enhance performance and stability.

Aluminum oxide barriers are also disclosed in the prior art as a barrier layer for electroluminescent displays. For example Japanese patent application 2003-332081 discloses an aluminum oxide layer disposed between the thick dielectric layers and the phosphor layer in a thick dielectric electroluminescent device. In the disclosed device a zinc sulfide layer is placed between the upper most aluminum oxide dielectric layer and the thioaluminate phosphor layer. The zinc sulfide layer functions as part of the phosphor layer in that electron injection for light emission occurs at the interface between the aluminum oxide layer and the zinc sulfide layer. The zinc sulfide layer inhibits sulfur loss from the thioaluminate material.

Aluminum oxide layers are also known to be used in organic electroluminescent devices where such layers are provided adjacent to a phosphor or substrate as described for example in U.S. Pat. Nos. 4,209,705, 4,751,427, 5,229,628, 5,858,561, 6,113,977, 6,358,632 and 6,589,674 as well as in U.S. 2003/0160247 and U.S. 2004/0115859.

These aforementioned developments provide thick film dielectric electroluminescent displays that fully meet the luminosity and colour spectrum capability of cathode ray tube (CRT) based television. However, it is still desired to further improve the operating stability to more fully meet television product specifications.

SUMMARY OF THE INVENTION

The present invention relates to an ac electroluminescent display employing an alkaline earth phosphor doped with a rare earth activator species, the display having an improved operating life. The improved operating life is achieved by providing one or more layers of a material above the top surface of the composite thick film dielectric layer that is sufficiently thick to act as a barrier to deleterious ions and is also slightly electrically conductive so as to maximize the effective electrical capacitance of the composite layer to reduce the operating voltage drop across the layer as compared to a similar non-conductive layer of the same thickness and prevents a substantial increase in the operating voltage of the display due to the presence of the layer. The electrical conductivity of the layer is sufficiently small that significant current does not flow between adjacent pixels with different applied voltages so that pixel cross-talk is substantially avoided.

In embodiments of the present invention, the one or more layers are aluminum oxide layers positioned between a composite thick film dielectric layer and one or more thin film dielectric layers of a different non lead-containing composition positioned under the phosphor layer of the display. The aluminum oxide layer(s) are not used alone directly adjacent or in contact with the alkaline earth phosphor thin film layer.

According to an aspect of the present invention is an improved thick film dielectric electroluminescent display comprising one or more layers of a material between the composite thick film dielectric layer and another thin film dielectric layer of a different non lead-containing composition positioned under the phosphor layer of the display, wherein said layer(s) function as a barrier to deleterious ions and is slightly electrically conductive.

According to another aspect of the present invention is an improved thick film dielectric electroluminescent display comprising one or more layers of aluminum oxide between the composite thick film dielectric layer and another thin film dielectric layer of a different non lead-containing composition that are positioned under the phosphor layer of the display, wherein an uppermost aluminum oxide layer is not in contact with a phosphor film within said display when a single layer of aluminum oxide is provided.

According to another aspect of the present invention is an improved composite thick film dielectric structure, said structure comprising:

(a) a composite thick film dielectric layer;

(b) one or more layers of aluminum oxide provided on top and adjacent said composite thick film dielectric structure;

(c) one or more thin film dielectric layers of a non lead-containing composition on top of (b); and (d) optionally one or more layers of aluminum oxide provided in between said thin film dielectric layers of (c) and/or on top and adjacent to said thin film dielectric layers of (c).

According to yet a further aspect of the present invention is an improved composite thick film dielectric structure, said structure comprising;

a composite thick film dielectric layer;

a first set of one or more aluminum oxide layers provided on top and in contact with said composite thick film dielectric layer;

one or more first thin film dielectric layers of a non lead-containing composition on top of said first set of aluminum oxide layers;

a second set of one or more aluminum oxide layers provided on top of said first thin film dielectric layers;

optionally a set of one or more second thin film dielectric layers of a non lead-containing composition on top of said second set of aluminum oxide layers; and optionally a third set of one or more aluminum oxide layers provided on top of said second thin film dielectric layers.

In this aspect a rare earth metal activated alkaline earth phosphor material is provided on top of the third aluminum oxide layers.

According to another aspect of the present invention is an improved thick film dielectric electroluminescent display comprising a composite thick film dielectric layer and a rare earth activated alkaline earth phosphor film, the display further comprising one or more layers of aluminum oxide between the composite thick film dielectric layer and another thin film dielectric layer of a different non lead-containing composition positioned under the phosphor layer of the display.

According to yet another aspect of the present invention is a thick film dielectric electroluminescent display comprising in sequence:

a substrate;

a metal electrode layer;

a composite thick film dielectric layer;

a first layer of aluminum oxide;

a barium titanate layer;

an optional second layer of aluminum oxide;

an optional barium tantalate layer;

an optional third layer of aluminum oxide; and a phosphor thin film layer.

In aspects a layer of aluminum nitride is provided on top of the phosphor layer followed by a thin ITO upper electrode layer.

According to yet another aspect of the present invention is an ac electroluminescent display comprising a composite thick film dielectric layer and a rare earth activated alkaline-earth phosphor deposited over the composite thick film dielectric layer, wherein at least one vacuum-deposited aluminum oxide layer is provided directly on the top surface of the composite thick film dielectric layer and further wherein said composite thick film dielectric layer is formed on a substrate with a formed electrode pattern by the sequential steps of:

depositing a high constant dielectric layer by printing a paste containing dielectric powder and then sintering the printed layer and depositing a smoothing layer formed using a metal organic deposition (MOD) method over the printed and sintered layer thereby forming a composite thick film dielectric layer;

vacuum depositing an aluminum oxide layer on said composite thick film dielectric layer; and depositing at least one lead-free high dielectric constant layer over the aluminum oxide layer using a sputtering or MOD method.

In aspects of the present invention a second vacuum deposited aluminum oxide layer is deposited over the lead-free high dielectric constant layer of said dielectric structure and a second lead-free high dielectric constant layer is deposited over the second vacuum deposited aluminum oxide layer.

In further aspects of the invention the lead-free high dielectric constant material comprises barium titanate.

In further aspects of the invention the second lead-free high dielectric constant layer comprises barium tantalate.

In yet further aspects of the present invention an additional aluminum oxide layer is vacuum deposited over the plurality of high dielectric layers prior to deposition of the phosphor film.

In still further aspects of the invention the second lead free high dielectric constant layer is deposited using a sputtering method.

In still further aspects of the invention the second lead free high dielectric constant layer is deposited using a MOD method.

Still in further aspects of the invention the initially deposited lead free high dielectric constant layer is deposited using a sputtering method.

Other features and advantages of the present invention will become apparent from the following detailed description. It should be understood, however, that the detailed description and the specific examples while indicating embodiments of the invention are given by way of illustration only, since various changes and modifications within the spirit and scope of the invention will become apparent to those skilled in the art from said detailed description.

BRIEF DESCRIPTION OF THE DRAWINGS

The present invention will become more fully understood from the detailed description given herein and from the accompanying drawings, which are given by way of illustration only and do not limit the intended scope of the invention.

Other features and advantages of the present invention will become apparent from the following detailed description. It should be understood, however, that the detailed description and the specific examples while indicating embodiments of the invention are given by way of illustration only, since various changes and modifications within the spirit and scope of the invention will become apparent to those skilled in the art from said detailed description.

DETAILED DESCRIPTION OF THE INVENTION

The present invention is a thick film dielectric electroluminescent display comprising a composite thick film dielectric layer and a thin film phosphor layer doped with a rare earth activator species, the display having an improved operating life. The improved operating life is due to the provision of one or more layers of a material where at least one of the one or more layers is adjacent and in contact to the top of the composite thick film dielectric layer that is sufficiently thick to act as a barrier to deleterious ions and is also slightly electrically conductive. The present invention is also an improved composite thick film dielectric structure incorporating one or more layers of a material where at least one of the layers is directly adjacent and in contact to the top of the composite thick film dielectric layer. In embodiments of the invention the material is aluminum oxide. In various aspects of the embodiments of the invention further layer(s) of aluminum oxide are provided within (i.e. in between) one or more thin film dielectric layers of a non lead-containing composition that may be provided within the thick film dielectric display, but that are positioned below the phosphor layer of the display.

Figure 1:
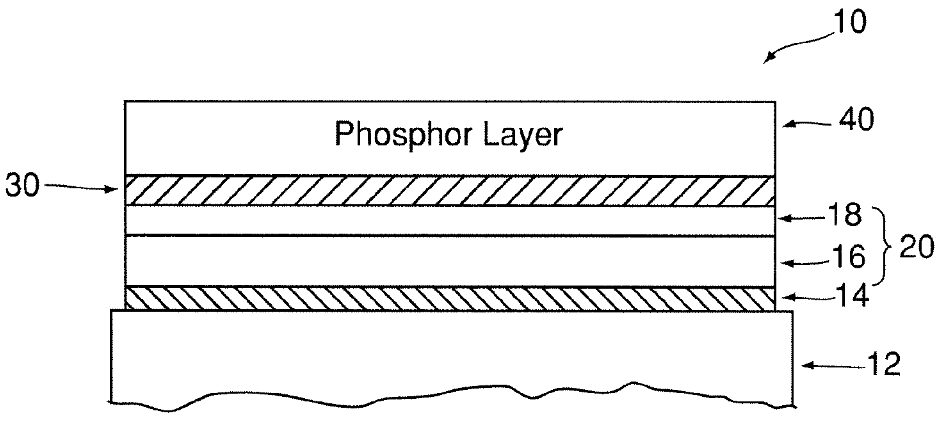
Fig.1 (Prior Art)
FIG. 1 shows a schematic drawing of a cross section of a part of a thick film dielectric electroluminescent display showing the position of an aluminum oxide layer constructed according to the prior art.

FIG. 1 shows a schematic drawing of a portion of a cross section of such a display as known in the prior art. The display 10 has a substrate 12 with a metal conductor layer 14 (i.e. gold), a thick film dielectric layer (i.e. PMT-PT), and a smoothing layer 18. Together the thick film dielectric layer 16 and the smoothing layer 18 form the composite thick film dielectric layer 20. A layer of aluminum oxide 30 is shown adjacent to the phosphor layer 40. A further layer of aluminum nitride can also be provided on the top portion of the phosphor 40 (not shown) as well as a thin film dielectric layer and then an ITO transport electrode (not shown). Other aspects of the composite thick film dielectric electroluminescent display are also present but not shown in the figure.

In contrast, the present invention is an improved composite thick film dielectric structure that has one or more layers of a material provided as a film that functions as a barrier to deleterious ions that may originate from within the composite thick film dielectric layer, the lower electrodes or the substrate upon which the display is constructed and simultaneously is slightly electrically conductive so as to maximize the effective electrical capacitance of the layer to reduce the operating voltage drop across the layer as compared to a similar non-conductive layer of the same thickness and thus prevents a substantial increase in the operating voltage of the display due to the presence of the layer.

Figure 2:
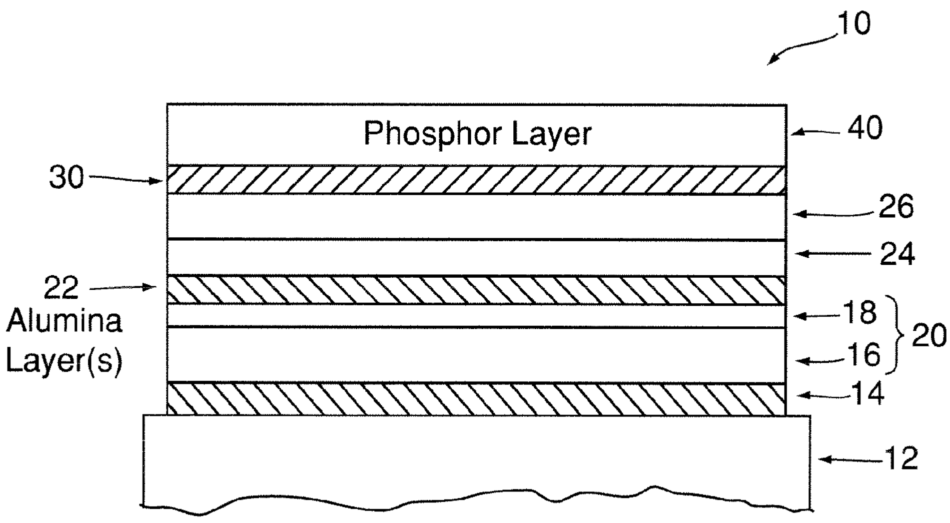
FIG. 2 is a schematic drawing of the cross section of a part of a thick film dielectric electroluminescent device showing the position of aluminum oxide layers according to embodiments of the present invention.

FIG. 2 shows one non-limiting embodiment of the invention. The display 10 has a substrate 12 with a metal conductor layer 14 (i.e. gold), a thick film dielectric layer (i.e. PMN-PT) 16, and a smoothing layer 18. Together the thick film dielectric layer 16 and the smoothing layer 18 form the composite thick film dielectric layer 20. A layer of aluminum oxide 22 is provided on the composite thick film dielectric layer 20. On the aluminum oxide layer 22 is provided a layer of barium titanate 24 followed by a layer of barium tantalate 26 and then an optional layer of aluminum oxide 30 followed by the phosphor layer 40. A thin film layer of aluminum nitride can also be provided on the top portion of the phosphor 40 (not shown) that functions as a dielectric layer and an ITO optically transparent electrode can be provided over the aluminum nitride layer (not shown). Other aspects of the composite thick film dielectric electroluminescent display are also present but not shown in the figure.

Figure 3:
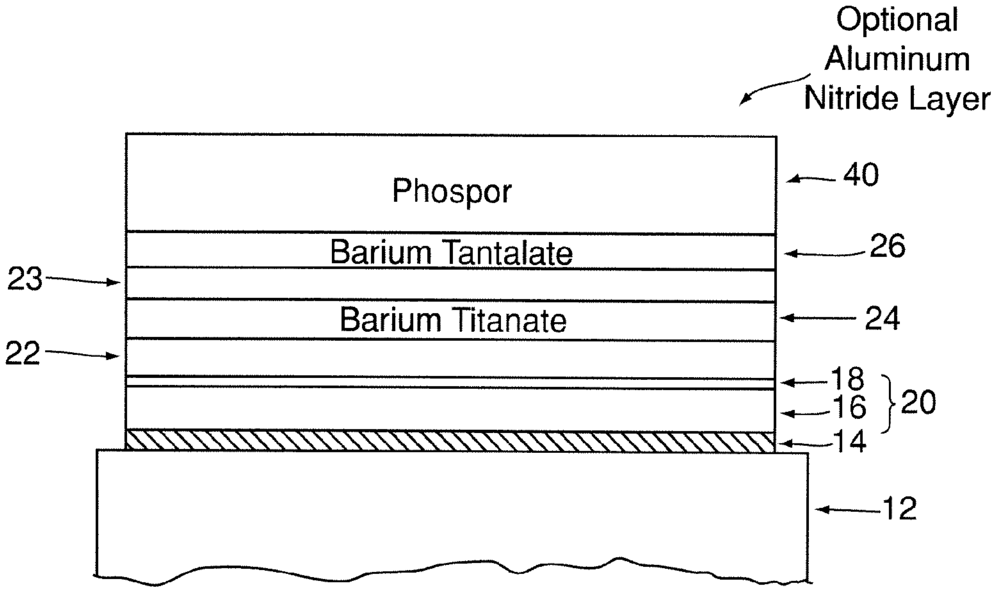
FIG. 3 is a schematic drawing of the cross section of a part of a thick film dielectric electroluminescent device showing the position of aluminum oxide layers according to further embodiments of the present invention.

FIG. 3 shows another non-limiting embodiment of the invention. The display 10 has a substrate 12 with a metal conductor layer 14 (i.e. gold), a thick film dielectric layer (i.e. PMN-PT) 16, and a smoothing layer 18. Together the thick film dielectric layer 16 and the smoothing layer 18 form the composite thick film dielectric layer 20. A layer of aluminum oxide 22 is provided on the composite thick film dielectric layer 20. On the aluminum oxide layer 22 is provided a layer of barium titanate 24 followed by a further layer of aluminum oxide 23 followed by a layer of barium tantalate 26 (an optional layer of aluminum oxide 30 can be provided on the barium tantalate 26 layer) followed by the phosphor layer 40. A layer of aluminum nitride can also be provided on the top portion of the phosphor 40 (not shown) to function as a thin film dielectric layer and an ITO optically transparent t electrode (not shown) can be provided over the aluminum nitride layer. Other aspects of the composite thick film dielectric electroluminescent display are also present but not shown in the figure.

Figure 4:
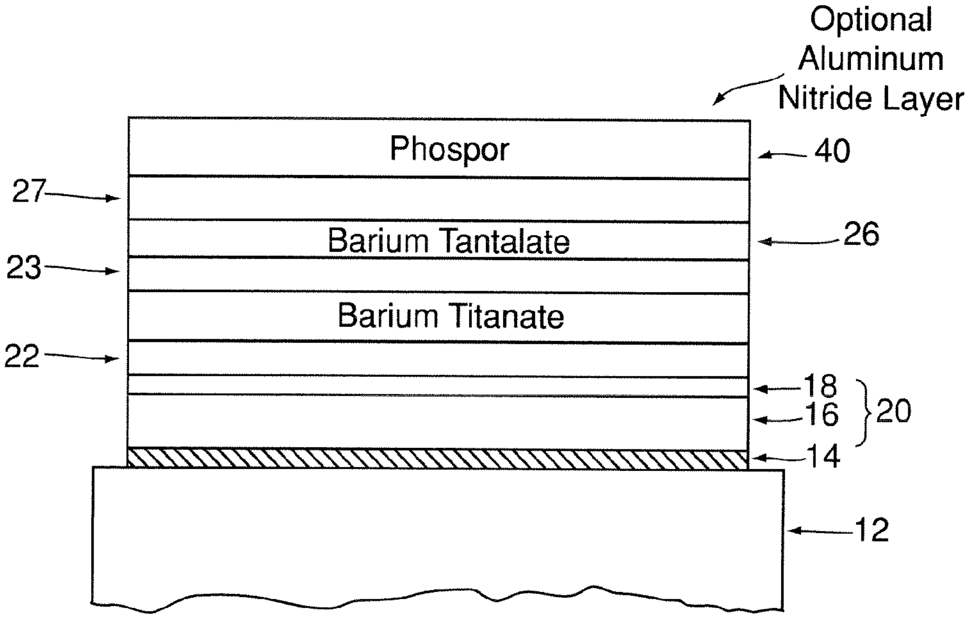
FIG. 4 is a schematic drawing of the cross section of a part of a thick film dielectric electroluminescent device showing the position of aluminum oxide layers according to still further embodiments of the present invention.

FIG. 4 shows yet another non-limiting embodiment of the invention. The display 10 has a substrate 12 with a metal conductor layer 14 (i.e. gold), a thick film dielectric layer (i.e. PMN-PT) 16, and a smoothing layer 18. Together the thick film dielectric layer 16 and the smoothing layer 18 form the composite thick film dielectric layer 20. A layer of aluminum oxide 22 is provided on the composite thick film dielectric layer 20. On the aluminum oxide layer 22 is provided a layer of barium titanate 24 followed by a further layer of aluminum oxide 23 followed by a layer of barium tantalate 26 followed by yet another layer of aluminum oxide 27 and then followed by the phosphor layer 40. A layer of aluminum nitride can also be provided on the top portion of the phosphor 40 (not shown) to function as a thin film dielectric layer and then an optically transparent ITO electrode can be provided over the aluminum nitride layer (not shown). Other aspects of the composite thick film dielectric electroluminescent display are also present but not shown in the figure.

It is understood by one of skill in the art that the figures provided herein are schematic and show various non-limiting embodiments of the invention. It would be understood that other layers may also be provided within the thick film dielectric electroluminescent display.

In aspects of the present invention, the material of the invention acts in conjunction with the composite thick film dielectric layer as a barrier to deleterious ions and is also slightly electrically conductive. In an aspect the material is a thin film of aluminum oxide provided between the composite thick film dielectric layer and another high dielectric constant thin film dielectric layer of a different non lead-containing composition positioned under the phosphor layer that may be directly adjacent and in contact with the top side or the upper portion of the composite thick film dielectric layer. The aluminum oxide layer is not a single layer directly adjacent to or in contact with the phosphor layer. The aluminum oxide layer is provided on top of the smoothing layer of the composite thick film dielectric layer, directly in contact with it. Further layers of aluminum oxide can be provided on top of the barium titanate layer that is typically provided within the thick film dielectric electroluminescent device as is shown in non-limiting embodiments in the figures. Furthermore, further layers of aluminum oxide can be provided on top of the barium tantalate layer that may be incorporated in the thick film dielectric electroluminescent device as is also shown in the non-limiting embodiments in the figures. Thus in the present invention, aluminum oxide layers can be incorporated (a) only on top and in direct contact with the smoothing layer of the composite thick film dielectric layer; (b) as in (a) but also on top and in direct contact with the barium titanate layer; (c) as in (a) and/or (b) but also on top and in direct contact with a barium tantalate layer. The only embodiment not encompassed in the present invention is the sole provision of an aluminum oxide layer in contact with the bottom (substrate side) portion of the phosphor layer. Thus the one or more aluminum oxide layers of the invention are provided between the top of the composite thick film dielectric layer and the bottom side of the phosphor film, i.e. opposite the viewing side of the display structure as is understood by one of skill in the art.

It is desirable that these aluminum oxide layer(s) do not substantially affect the dynamics of electron injection into the phosphor layer to generate light. Since electrons injected into the phosphor layer from the lower side adjacent the thick film dielectric layer originate very close to the interface between the phosphor and the composite thick film dielectric layer, the aluminum oxide layer(s) of the present invention are embedded deep enough within the lower dielectric structure of the display that they lie below the zone from which the injected electrons originate. More specifically the detailed chemical makeup of these layers including the presence of dopants within these layers has no significant effect on the electron injection dynamics.

A part of the function of the aluminum oxide layer(s) is to minimize migration of chemical species from deep within the composite thick film dielectric structure into the phosphor layer where they may degrade the electron injection dynamics or the efficiency of the rare earth activator atoms in generating light. Since the aluminum oxide layer(s) may be positioned between other dielectric layers or adjacent thereto including the composite thick film dielectric layer, they can be doped with other atomic species migrating from these layers to render them slightly conductive. Such doping will minimize the voltage drop across the aluminum oxide layer(s). This can be understood by representing a doped aluminum oxide layer with an equivalent electrical circuit consisting of a capacitor representing the dielectric properties of the layer in parallel with a resistor representing its electrical conductivity. The electrical impedance of the layer is then a function of the frequency distribution of the driving pulses, which comprises a fundamental frequency associated with the pulse width and higher frequency harmonics in accordance with the Fourier components of the pulse shape. Typically the aluminum oxide film resistivity can be selected to be sufficiently low so that the film resistance in the direction perpendicular to the film surface is sufficiently low to lower the overall impedance in that direction as compared to the impedance of the capacitance of the layer approximated by ½πfC where f is the fundamental frequency associated with the driving pulse and C is the layer capacitance. If this condition is met, the voltage drop across the aluminum oxide layer is lower than it would be if its impedance were purely capacitive and so the threshold voltage and the operation voltage for the device are lowered. Generally the aluminum oxide layer resistivity can be made sufficiently low to meet the above condition and at the same time still be sufficiently high that the film resistance in directions along the film is sufficiently high that cross-talk between pixels due to inter-pixel current flow is minimized to an acceptable level. Control of the electrical resistivity of the aluminum oxide layer can be effected through a control of the dopant concentration and type within the layer. Such dopants may be added as part of the deposited composition or may diffuse into the aluminum oxide layer(s) from adjacent layers during heat treatment of the composite dielectric layer or of the entire device The advantages of the present aluminum oxide layer arise from its position between said thick film dielectric layer and another thin film dielectric layer of a different non lead-containing composition positioned under the phosphor layer. The layer of aluminum oxide is provided between said composite thick film dielectric layer and another thin film dielectric layer of a different non lead-containing composition positioned under the phosphor layer and may be directly against and in contact with the smoothing layer of the composite thick film dielectric layer, but it isn't provided as one layer solely in contact with the phosphor film layer. There are one or more other layers interspersed there-between. The aluminum oxide is provided in locations between the top of the smoothing layer of the composite thick film dielectric layer and the phosphor layer.

The aluminum oxide layer (no matter where incorporated above the composite thick film dielectric layer and the bottom side of the phosphor layer) is about 25 to about 50 nanometers in total thickness and can be any thickness ranges in between. Thus the aluminum oxide layer can be deposited as one or more thinner layers (as a laminate of multiple thin layers of aluminum oxide) so long as the total thickness of each individual layer is about 25 to about 50 nanometers no matter where it is positioned and no matter if one, two or three layers of aluminum oxide are provided in the display below the phosphor layer as is shown in a non-limiting manner in FIGS. 2-4. In aspects, the thickness of the aluminum oxide layer is up to about 50 nanometers and in other aspects up to about 25 nanometers. It is understood that the thickness can be provided as increments of any amount of these ranges of up to 50 nm.

While the mechanism by which the aluminum oxide layer(s) effect the improvement is not fully understood, it is believed that the layer(s) may act as a barrier to chemical species that may cause a reduction in the realizable luminance of the phosphor material by causing a reduction in the efficiency with which electrons are injected into the phosphor film during operation of the device, by causing a reduction in the efficiency with which electrons interact with the activator species in the phosphor material to emit light, or by reducing the efficiency by which light generated in the phosphor is transmitted from the device to provide useful luminance. The most effective location for at least one of the aluminum oxide layers is directly upon a smoothing layer deposited on a printed and sintered dielectric layer, said printed and sintered dielectric layer and said smoothing layer formed as taught in U.S. Patent Publication No. 2005/0202157. Briefly in one embodiment the thick composite thick film dielectric layer may be fabricated as follows. The thick film dielectric layer is deposited by thick film techniques which are known in the electronics/semiconductor industries and may be formed from a ferroelectric material. Exemplary materials for the layer include BaTiO3, PbTiO3, lead magnesium niobate (PMN) and PMN-PT, a material including lead and magnesium niobates and titanates. Such materials may be formulated from their dielectric powders, or may be obtained as commercial pastes. Thick film deposition techniques are known in art, such as green tapes, roll coating, and doctor blade application, but screen printing is most preferred in aspects. Multiple layers are preferred, following each deposition with drying or baking or sintering in order to achieve low porosity, high crystallinity and minimal cracking. The deposited thickness of the thick film dielectric layer is generally in the range of 10 to 300 micrometers. Pressing is preferably accomplished by cold isostatic pressing the combined substrate, electrode, dielectric layer part at a high pressure such as 10,000-50,000 psi (70,000–350,000 kPa), prior to sintering the material, A thinner, second smoothing layer 20 is provided above the pressed and sintered thick film dielectric layer to provide a smoother surface. It is formed from a second ceramic material which may have a dielectric constant less than that of the dielectric layer 18. A thickness of about 1-10 micrometers. The desired thickness of this second dielectric layer 20 is generally a function of smoothness, that is the layer may be as thin as possible, provided a smooth surface is achieved. To provide a smooth surface, sol gel deposition techniques are preferably used, also referred to a metal organic deposition (MOD), followed by high temperature heating or firing, in order to convert to a ceramic material.

Sol gel deposition techniques are well understood in the art, see for example "Fundamental Principles of Sol Gel Technology", R. W. Jones, The Institute of Metals, 1989. The sol gel materials are deposited on the first dielectric layer 18 in a manner to achieve a smooth surface. In addition to providing a smooth surface, the sol gel process facilitates filling of pores in the sintered thick film layer. Spin deposition or dipping are most preferred. The sol can be deposited in several stages if desired. The thickness of the smoothing layer is controlled by varying the viscosity of the sol gel and by altering the spinning speed. After spinning, a thin layer of wet sol is formed on the surface. The sol gel smoothing layer is heated, generally at less than 100° C. to form a ceramic surface. The sol smoothing layer may also be deposited by dipping. The surface to be coated is dipped into the sol and then pulled out at a constant speed, usually very slowly. The thickness of the smoothing layer is controlled by altering the viscosity of the sol and the pulling speed. The sol smoothing layer may also be screen printed or spray coated. The ceramic material used in the smoothing layer is made of materials such as lead zirconate titanate (PZT), lead lanthanum zirconate titanate (PLZT), and the titanates of Sr, Pb and Ba used in the first thick film dielectric layer.

Further thin film dielectric layers (such as barium titanate and/or barium tantalate) having a higher chemical purity than said printed and sintered dielectric layer and said smoothing layer are deposited over the at least one aluminum oxide layer prior to deposition of a phosphor layer to chemically isolate the aluminum oxide layer from the phosphor layer. In aspects $Ba_xSr_{1-x}TiO_3$, where $0<x<1$ or $BaTa_2O_6$ are suitable layers. The barium titanate crystalline layer may be 0.05 to 1.0 micrometers thick, and in some aspects 0.1 to 0.3 micrometers thick. Such thicknesses are significantly less than the thicknesses of either the primary thick film dielectric layer or the overlying surface smoothing layer that together form the composite thick film dielectric layer. In aspects the barium titanate typically provided as a layer of about 0.2 micrometers and the barium tantalate typically about 0.05 micrometers. It is desirable that the aluminum oxide layer(s) be provided on the upper portion of the composite thick film dielectric layer above and in contact with the smoothing layer so that an effectively continuous aluminum oxide layer may be formed to provide an effective barrier against the diffusion of atomic species from the lower part of the structure into the phosphor layer.

Again, the invention is particularly applicable to electroluminescent devices employing a composite thick film dielectric layer comprising a high dielectric constant dielectric layer of a thick dielectric material which is a composite material comprising two or more oxide compounds that may evolve oxygen or related chemical species that are deleterious to phosphor performance in response to thermal processing or device operation and wherein the surface of the thick dielectric is rough on the scale of the phosphor thickness resulting in cracks or pinholes through the device structure and wherein the composite thick film dielectric layer may contain connected voids that may assist in the dispersal of such species, thus contributing to a loss of luminance and operating efficiency over the operating life of the device. Such suitable composite thick film dielectric layers comprise a lead magnesium niobate (PMN) or lead magnesium niobate titanate (PMN-PT) sintered thick film layer with a smoothing layer of lead zirconate titanate (PZT) as is described in U.S. Pat. No. 5,432,015, WO 00/70917 and WO 03/056879 (the disclosures of which are incorporated herein in their entirety).

The phosphor in aspects of the present invention is an alkaline earth phosphor and in further aspects is of the form $AB_xC_y$: RE where A is one or more of Mg, Ca, Sr or Ba and B is at least one of Al or In and C is at least one of S or Se and may include oxygen at a relative atomic concentration that is less than 0.2 of the combined S and Se concentrations. RE is one or more rare earth activator species that generate the required light spectrum and is preferably Eu or Ce. The value of x is between 2-4 and the value of y is between 4-7. A most desired aspect of the phosphor material is $BaAl_2S_4$ activated with europium.

The invention may also function to relieve stress within the composite thick film dielectric layer to inhibit or prevent cracks from forming during heat treatment steps used in the fabrication of the layer or the complete electroluminescent display by distributing accumulated stress throughout the thickness of the composite thick film dielectric layer rather than having it concentrated at specific locations within the device structure.

The invention is applicable to electroluminescent displays constructed on a ceramic, glass or glass ceramic substrate. In the event that a glass substrate is used, atomic species from the glass substrate may diffuse upwards during display processing and aluminum oxide layers embedded within the composite dielectric structure may inhibit migration of these species up to the phosphor layer.

The present invention is particularly directed towards improving the operating life of thick film dielectric electroluminescent displays incorporating rare earth-activated alkaline earth thioaluminate phosphor materials, especially europium activated barium thioaluminate. While the detailed mechanism for stabilizing these phosphors is not understood, preventing deleterious species from reacting with the phosphors may help ensure that the rare earth activator species remain dissolved in the crystal lattice of the host thioaluminate compounds. Reaction of the phosphor with oxygen may cause precipitation of aluminum oxide from the phosphor, causing the remaining material to become more barium rich. It is known many different thioaluminate compounds exist with different ratios of alkaline earth elements to aluminum and different crystal structures for each composition and that not all of them are efficient phosphor hosts.

The invention also provides methods used to deposit the aluminum oxide layers of the invention. The barrier layers can be deposited using physical or chemical vapour deposition techniques. It extends to deposition processes for these materials that are carried out in a low pressure oxygen-containing atmosphere, wherein oxygen is incorporated into the thick film dielectric electroluminescent display structure to stabilize the composite thick film dielectric layer and/or the phosphor layer, by ensuring that reduced elemental species such as elemental aluminum or elemental sulfur are not present. An example of such a process is reactive sputtering under an oxygen-containing atmosphere.

The above disclosure generally describes the present invention. A more complete understanding can be obtained by reference to the following specific Examples. These Examples are described solely for purposes of illustration and are not intended to limit the scope of the invention. Changes in form and substitution of equivalents are contemplated as circumstances may suggest or render expedient. Although specific terms have been employed herein, such terms are intended in a descriptive sense and not for purposes of limitation.

The following examples are provided to elucidate some of the preferred embodiments of the invention, but are not intended to be limiting in their scope.

Example 1

This example serves to illustrate the performance and operating stability of devices of the prior art. A thick film dielectric electroluminescent display incorporating thin film phosphor layers comprising barium thioaluminate activated with europium was constructed. The substrate for the display was comprised of a 5 cm by 5 cm glass having a thickness of 0.1 cm. A gold electrode was deposited on the substrate, followed with a lead magnesium niobate-titanate thick film high dielectric constant dielectric layer and a PZT smoothing layer in accordance with the methods exemplified in Applicant's co-pending U.S. Patent Publication No. 2004/0033752 (the disclosure of which is incorporated herein by reference in its entirety). A thin film dielectric layer of barium titanate, with a thickness of about 120 nanometers, was deposited in accordance with the methods exemplified in U.S. Pat. No. 6,589,674 (the entirety of which is incorporated herein by reference). A second thin film layer of barium tantalate with a thickness of about 50 nanometers was deposited by a sputtering process on top of the barium titanate layer. A third thin film layer consisting of aluminum oxide with a thickness of about 25 nanometers was deposited by a sputtering process on top of the barium tantalate layer. Next a very thin aluminum sulfide seed layer followed by a europium doped barium aluminum sulfide composition were deposited and heat treated once both layers were deposited to form a phosphor layer consisting of a 400 nanometer thick barium thioaluminate phosphor film activated with about 3 atomic percent of europium with respect to barium. The crystal structure of the phosphor was that of BaAl2S4(I) as described in U.S. Patent Publication No. 2006/0027788 and as described and alternately referred to as α-BaAl2S4 by Stiles and Kamkar (Journal of Applied Physics Vol 100 (2006) pp 074508 1-5). The phosphor composition was deposited according to the methods described in U.S. Patent Publication No. 2005/0202162.

The heat treatment following phosphor deposition was done under a controlled atmosphere consisting of nitrogen containing up to 3 percent by volume of air at a peak temperature in the range of about 680° C. to 730° C. for several minutes. Next a 50 nanometer thick aluminum nitride layer was sputter-deposited in accordance with the methods exemplified in U.S. patent publication serial number 2004/0170864 the entirety of which is incorporated herein by reference. Finally an indium tin oxide film was sputter deposited to form a second electrode on the device.

Figure 5:
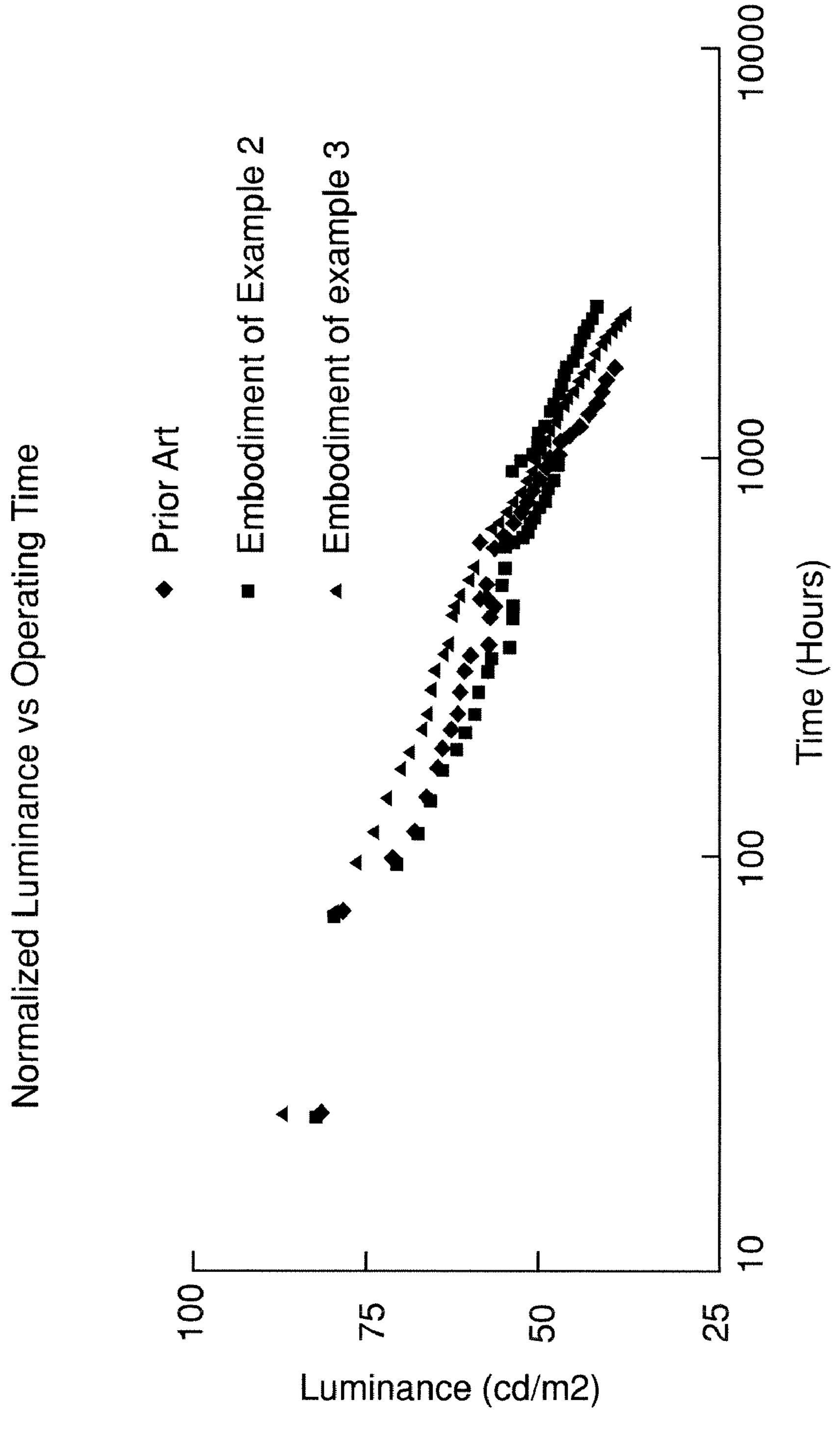
FIG. 5 is a graphical representation of the luminance of electroluminescent devices with and without the improvement of the invention as a function of aging time.

The device was tested by applying a 240 Hz alternating polarity square wave voltage waveform with a pulse width of 30 nanoseconds and an amplitude sufficient to generate a luminance of 250 candelas per square meter volts above the optical threshold voltage. Curve 1 in the graph shown in FIG. 5 shows the normalized luminance as a function of time scaled by a constant factor to give the expected operating time for the device when it is operated at a lower frequency of 150 Hz with a 30% duty cycle. The horizontal axis of the graph has a logarithmic time scale and it can be seen that the initial luminance of the device decreased in a logarithmic manner after about 100 hours of operation.

Example 2

This example serves to illustrate the advantages of the present invention compared to the prior art. A display was constructed similar to that of example 1, except that a 50 nanometer thick aluminum oxide layer was deposited using a sputtering method on the PZT smoothing layer prior to deposition of the barium titanate layer. Curve 2 in the graph shown in FIG. 5 shows the normalized luminance as a function of the expected operating time data for this device operated under similar conditions as the device described in example 1. The initial luminance also decreased in a logarithmic manner, similar to that of the device of example 1, but that the slope of the logarithmic decrease was significantly lower, providing for substantially longer operating life than for the device of example 1.

Example 3

This example serves to show the benefit of an alternate embodiment of the present invention. A display was constructed similar to that of example 2, except that an additional 50 nanometer thick aluminum oxide layer was deposited using a sputtering method on the barium titanate layer prior to deposition of the barium tantalate layer. Curve 3 in the graph shown in FIG. 5 shows the normalized luminance as a function of operating time data for this device operated under similar conditions as the devices described in examples 1 and 2. The initial luminance of this device also decreased in a logarithmic manner, similar to that of the devices of example 1 and 2. The slope of the logarithmic decrease was similar to that of example 2, indicating that the most significant improvement in operating stability is achieved with the provision of an embedded aluminum oxide layer directly in contact with the PZT smoothing layer.

Example 4

This example serves to illustrate the performance and operating stability of devices of the prior art having an alternate europium activated barium thioaluminate phosphor phase with a different crystal structure. Three display devices were constructed that were similar to the display of example 1 except that the processing conditions were adjusted to provide a phosphor film of BaAl2S4(II) as described in U.S. Patent Publication No. 2006/0027788 and as described and alternately referred to as β-BaAl2S4 by Stiles and Kamkar (Journal of Applied Physics Vol 100 (2006) pp 074508 1-5). Typically, thick dielectric devices of the prior art with β-BaAl2S4 phosphor films exhibit lower luminance, but longer life that those with β-BaAl2S4 phosphor films. The devices of this example were tested under the same conditions as the device of example 1 and gave an average expected operating lifetime to half of the initial luminance of about 13,000 hours.

Example 5

This example serves to illustrate the advantage of the invention to improve the lifetime of electroluminescent devices having β-BaAl2S4 phosphor films. Three display devices were constructed similar to those of example 4 except that an additional 25 nanometer thick layer of aluminum oxide was sputtered onto the PZT smoothing layer prior to deposition of the barium titanate layer in accordance with an embodiment of the present invention. The devices of this example were tested under the same conditions as the devices of example 4 and gave an average expected life to half of the initial luminance of about 28,000 hours.

The invention claimed is:

1. An electroluminescent display comprising an improved composite thick film dielectric structure, said structure comprising;

a composite thick film dielectric layer;

one or more layers of aluminum oxide or aluminum oxide doped with other atomic species provided on the top surface of said composite thick film dielectric layer, said material sufficiently thick to act as a barrier to deleterious ions and also be minimally electrically conductive;

a thin film phosphor layer;

wherein at least of one said one or more layers of said aluminum oxide or aluminum oxide doped with other atomic species is not in direct contact with said phosphor layer.

2. The electroluminescent display of claim 1, said structure further comprising one or more thin film dielectric layers of a non lead-containing composition on top of said one or more layers of aluminum oxide or aluminum oxide doped with other atomic species.

3. The electroluminescent display of claim 2, wherein said one or more layers of said aluminum oxide or aluminum oxide doped with other atomic species are provided on and/or in between said one or more thin film dielectric layers.

4. The electroluminescent display of claim 3, wherein said one or more thin film dielectric layers are selected from barium titanate and barium tantalate.

5. The electroluminescent display of claim 1, wherein said one or more layers is aluminum oxide.

6. The electroluminescent display of claim 5, wherein said structure comprises in sequence a composite thick film dielectric layer, a layer of aluminum oxide, a layer of barium titanate and a thin film phosphor layer.

7. The electroluminescent display of claim 5, wherein said structure comprises in sequence a composite thick film dielectric layer, a layer of aluminum oxide, a layer of barium titanate, a layer of barium tantalate and a thin film phosphor layer.

8. The electroluminescent display of claim 5, wherein said structure comprises in sequence a composite thick film dielectric layer, a layer of aluminum oxide, a layer of barium titanate, a layer of barium tantalate, a layer of aluminum oxide and a thin film phosphor layer.

9. The electroluminescent display of claim 5, wherein said structure comprises in sequence a composite thick film dielectric layer, a layer of aluminum oxide, a layer of barium titanate, a layer of aluminum oxide, a layer of barium tantalate, a layer of aluminum oxide and a thin film phosphor layer.

10. The electroluminescent display of claim 5, wherein said structure comprises in sequence a composite thick film dielectric layer, a layer of aluminum oxide, a layer of barium titanate, a layer of aluminum oxide, a layer of barium tantalate and a thin film phosphor layer.

11. The electroluminescent display of claim 5, wherein said aluminum oxide layer has a thickness of about 25 to about 50 nm.

12. The electroluminescent display of claim 5, wherein said aluminum oxide layer has a thickness of up to about 50 nm.

13. The electroluminescent display of claim 12, wherein said aluminum oxide layer has a thickness of up to about 25 nm.

14. The electroluminescent display of claim 13, wherein said phosphor layer is a thioaluminate.

15. The electroluminescent display of claim 14, wherein said phosphor layer is represented by $AB_xC_y$: RE, where A is one or more of Mg, Ca, Sr or Ba B is at least one of Al or In;

C is at least one of S or Se;

RE is a rare earth species;

x is between 2-4 and y is between 4-7.

16. The electroluminescent display of claim 15, wherein said rare earth species is selected from Eu and Ce.

17. The electroluminescent display of claim 16, wherein said phosphor is $BaAl_2S_4$ activated with europium.

18. The electroluminescent display of claim 1, wherein said structure further comprises a layer of aluminum nitride on said phosphor layer.

19. The electroluminescent display of claim 18, wherein said structure further comprises an ITO transparent layer on said aluminum nitride layer.

20. An electroluminescent display comprising a thick film dielectric structure, said structure comprising:

(a) a composite thick film dielectric layer;

(b) a layer of aluminum oxide provided on top adjacent to said composite thick film dielectric structure;

(c) a layer of barium titanate on top of (b);

(d) an optional layer of barium tantalate on top of (c); and (e) optionally a further layer of aluminum oxide provided on top of (c) and/or on top of (d).

21. The display of claim 20, wherein said aluminum oxide layer has a thickness of about 25 to about 50 nm.

22. The display of claim 20, wherein said aluminum oxide has a thickness of up to about 50 nm.

23. The display of claim 20, wherein said display comprises a thioaluminate phosphor layer.

24. The display of claim 23, wherein said phosphor layer is represented by $AB_xC_y$: RE, where A is one or more of Mg, Ca, Sr or Ba B is at least one of Al or In;

C is at least one of S or Se;

RE is Eu or Ce;

x is between 2-4 and y is between 4-7.

25. The display of claim 24, wherein said phosphor is $BaAl_2S_4$ activated with europium.

26. The display of claim 23, wherein said structure further comprises a layer of aluminum nitride on said phosphor layer.

27. The display of claim 26, wherein said structure further comprises an ITO transparent layer on said aluminum nitride layer.

28. The display of claim 20, wherein said display comprises a substrate with a metal electrode layer beneath said composite thick film dielectric layer.

* * * * *